Figure 1:
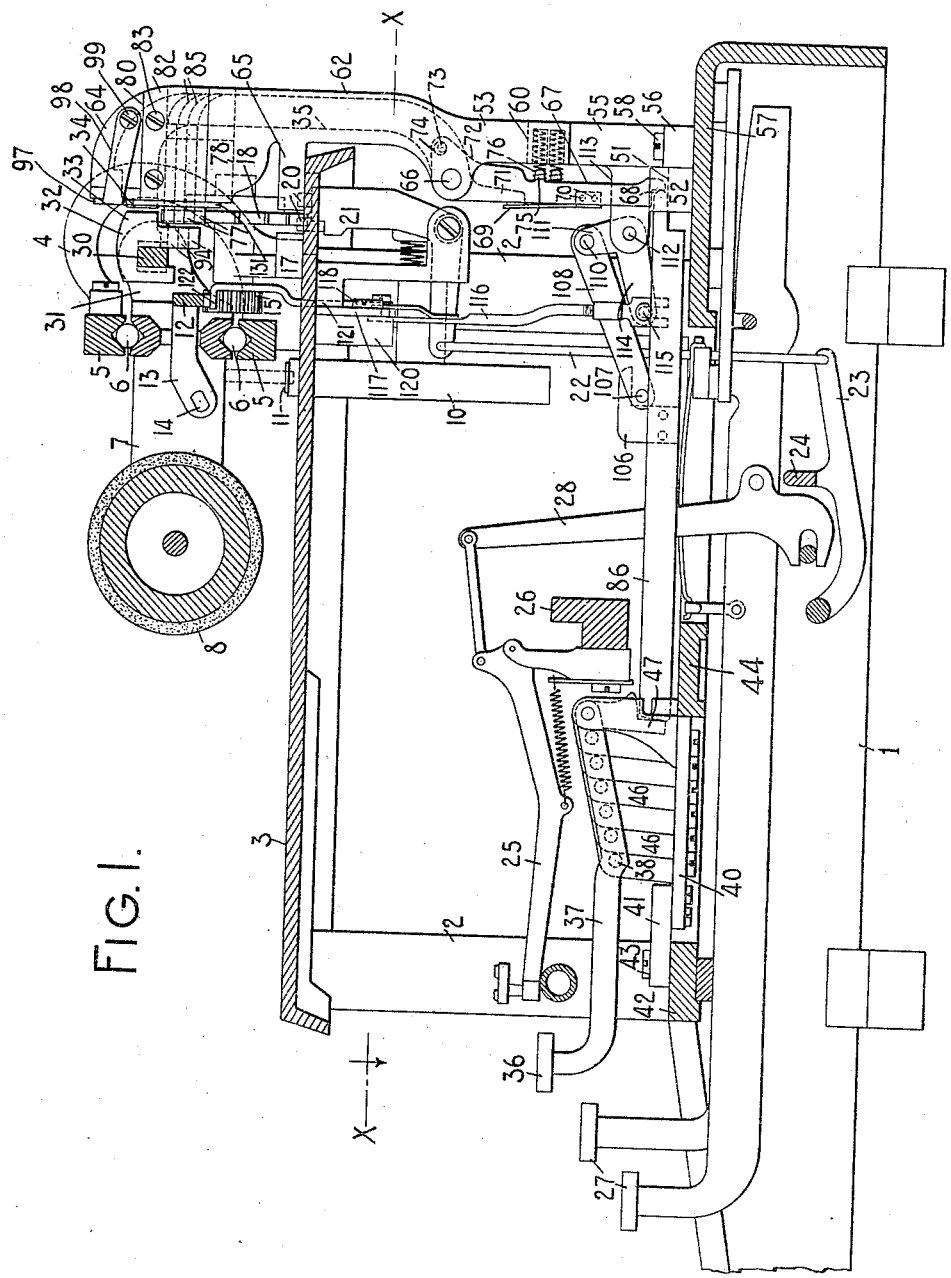

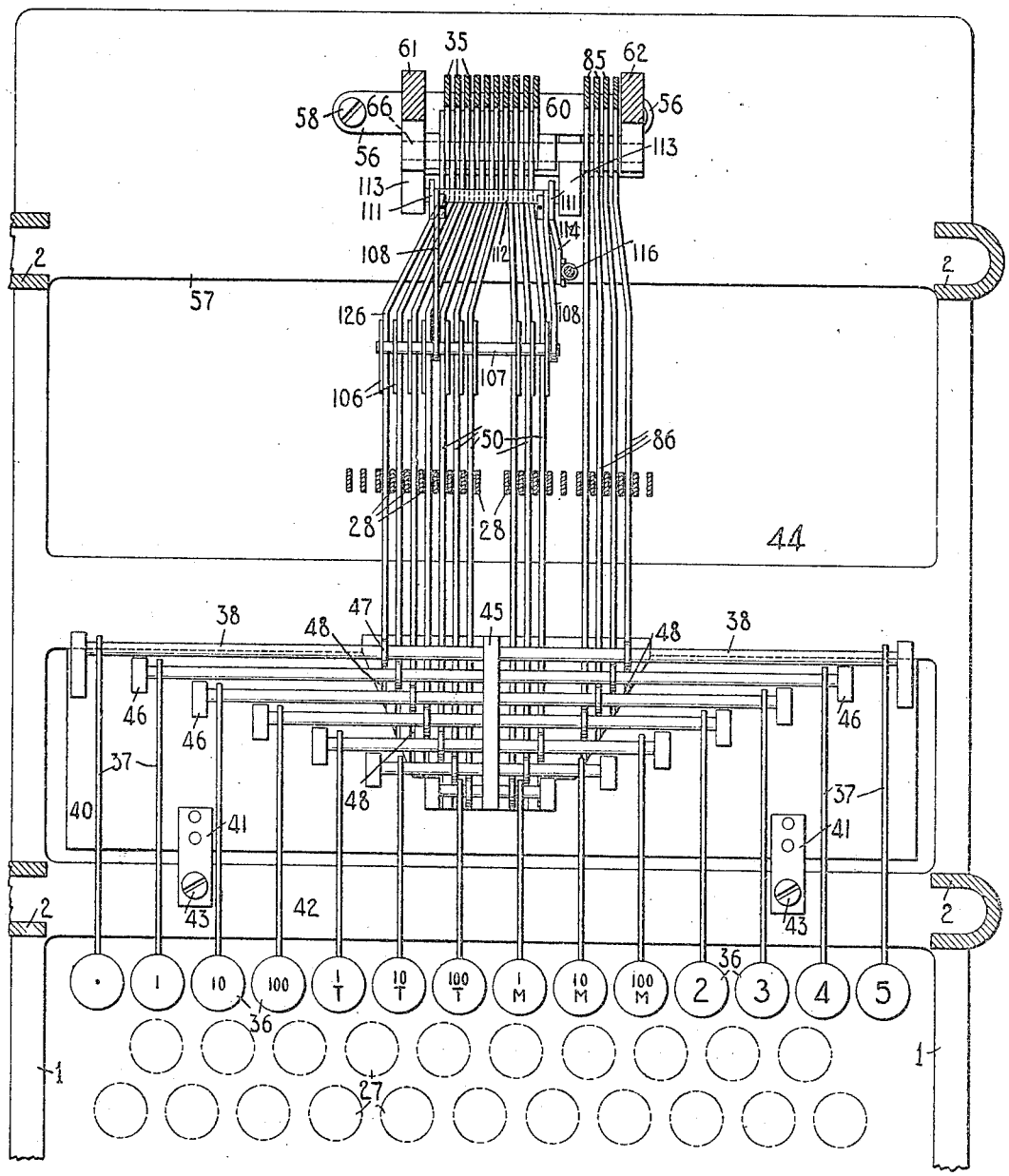

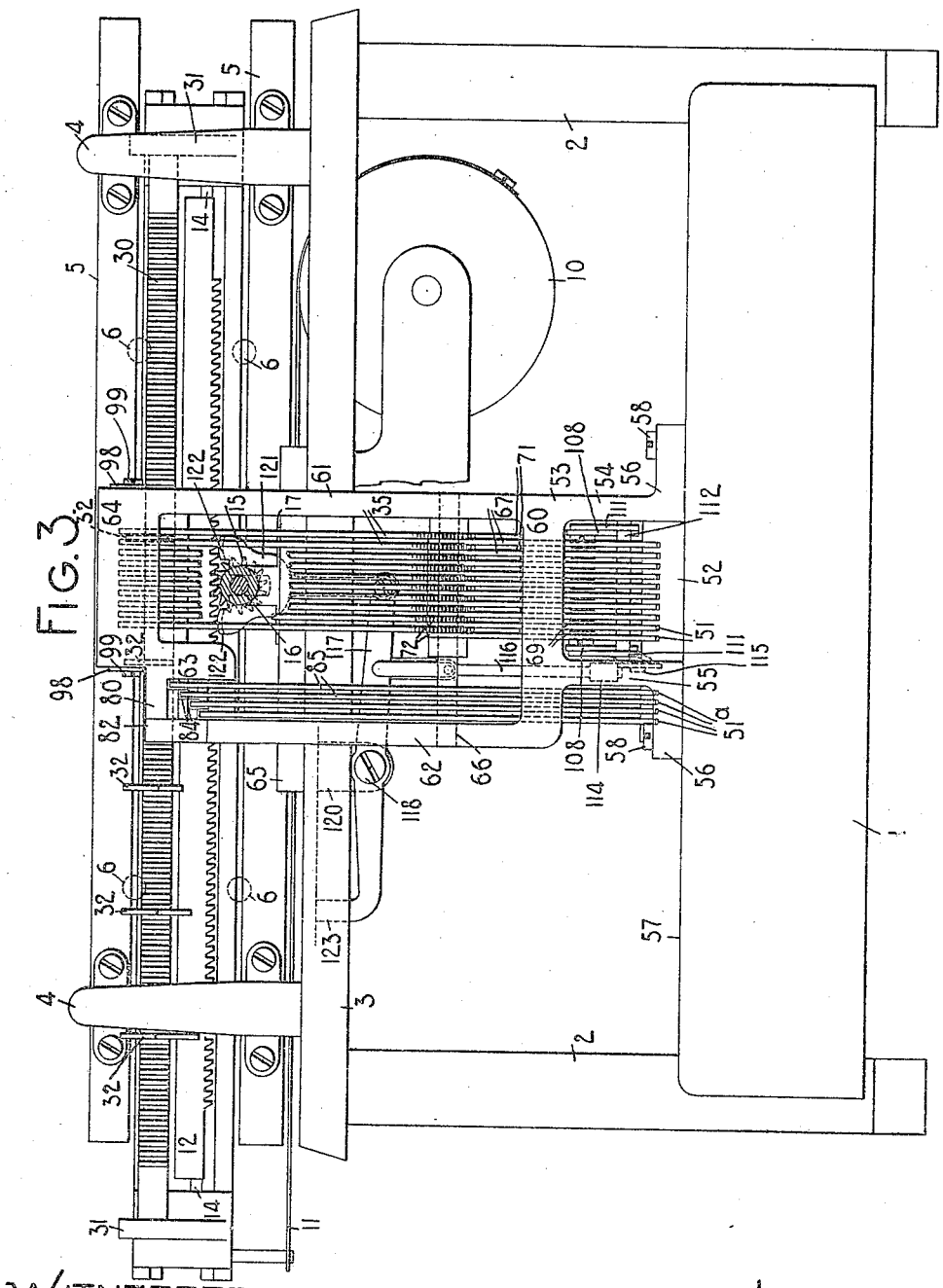

H. H. STEELE.
TYPE WRITING MACHINE.
APPLICATION FILED JAN. 15, 1909.
957,268.
Patented May 10, 1910.
5 SHEETS—SHEET 4.
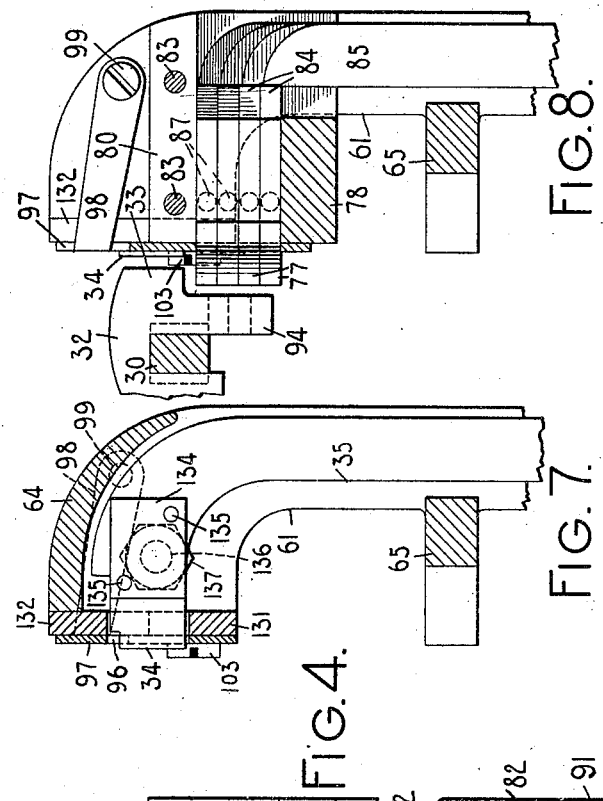
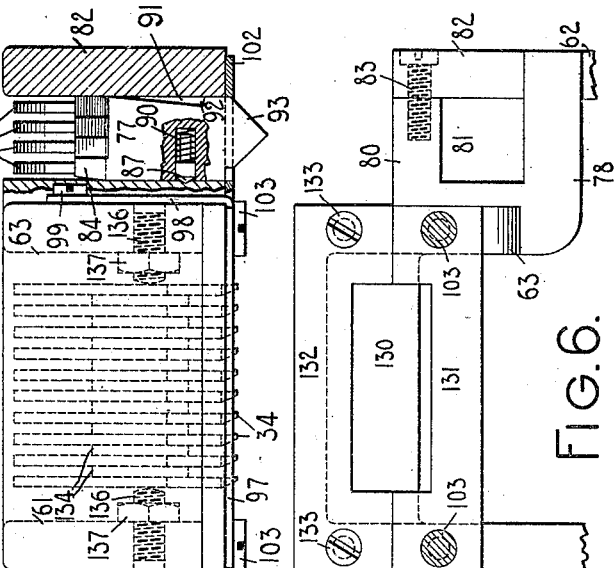
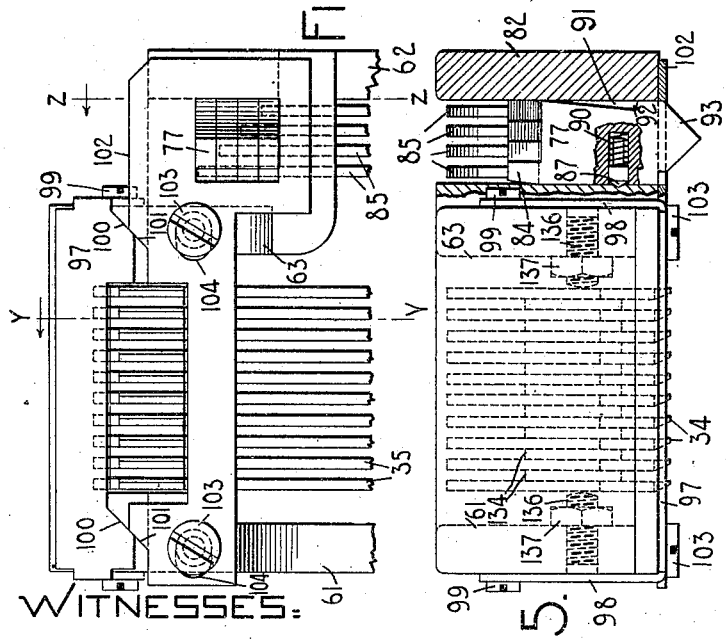
WITNESSES:
INVENTOR:
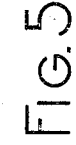
HIS ATTORNEY H. H. STEELE.
TYPE WRITING MACHINE.
APPLICATION FILED JAN. 15, 1909.
957,268.
Patented May 10, 1910.
5 SHEETS—SHEET 5.
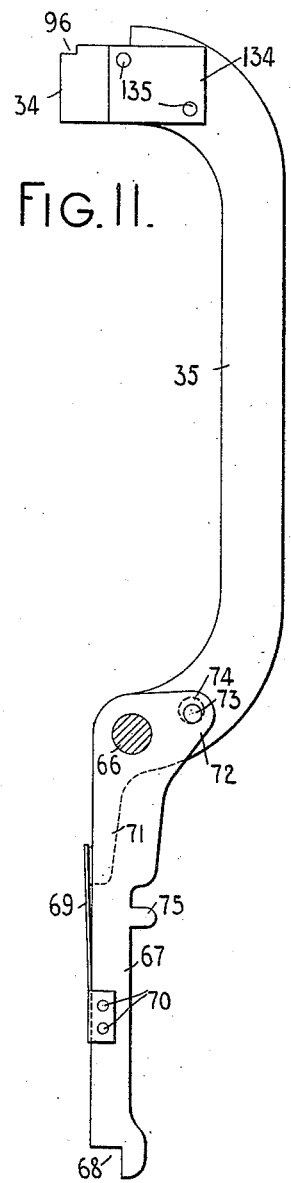
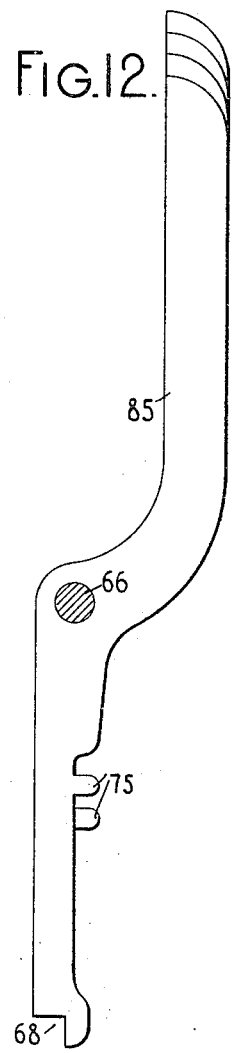
WITNESSES:
J. B. Reeves
R. H. Strother.
INVENTOR:
Herbert H. Steele
By Jacob Felbel
HIS ATTORNEY

UNITED STATES PATENT OFFICE.

HERBERT H. STEELE, OF MARCELLUS, NEW YORK, ASSIGNOR TO THE MONARCH TYPEWRITER COMPANY, OF SYRACUSE, NEW YORK, A CORPORATION OF NEW YORK.

TYPE-WRITING MACHINE.

957,268.      Specification of Letters Patent.      Patented May 10, 1910.

Application filed January 15, 1909. Serial No. 472,464.

*To all whom it may concern:*

Be it known that I, HERBERT H. STEELE, citizen of the United States, and resident of Marcellus, in the county of Onondaga and State of New York, have invented certain new and useful Improvements in Type-Writing Machines, of which the following is a specification.

My invention relates to tabulator mechanism for type-writing machines.

My invention has for its principal object to provide an improved column skipping or column selecting mechanism and especially a combined denominational tabulator and column skipping or selecting mechanism.

A further object is to provide a column selecting device in combination with a denominational tabulator and so constructed that the denominational tabulator may be operated independently after the ordinary fashion of such devices or it may be operated in connection with the column selecting mechanism in which case the carriage will move at a single operation to the desired denominational position in the selected column, intermediate columnar positions being skipped or passed.

To the above and other ends which will hereinafter appear, my invention consists in the features of construction, arrangements of parts and combinations of devices to be hereinafter described and claimed.

In the accompanying drawings, Figure 1 is a front to rear vertical sectional view of a typewriting machine in which my invention is embodied, the section being taken on an irregular line and parts of the machine being omitted. Fig. 2 is a view in section on the line *x—x* of Fig. 1, most of the mechanism of the typewriting machine except the tabulator mechanism being omitted. Fig. 3 is a rear elevation of the machine with parts broken away and parts in section. Fig. 4 is a fragmentary front view showing the upper part of the key actuated devices of the tabulator and the frame in which they are mounted. Fig. 5 is a top view of the same with parts in section and parts broken away. Fig. 6 is a view similar to Fig. 4 but with the movable parts omitted and showing only the framework. Fig. 7 is a view in vertical section on the line *y—y* of Fig. 4 and looking in the direction of the arrow at said line. Fig. 8 is a view in vertical section on the line *z—z* of Fig. 4 and looking in the direction of the arrow at said line. Fig. 9 is a fragmentary view similar to Fig. 5 but showing one of the column determining trips in operated position. Fig. 10 is a fragmentary view of part of Fig. 4 but with the parts in the positions corresponding to those of Fig. 9. Fig. 11 is a side view of one of the denominational stop levers. Fig. 12 is a right-hand side view of the upright levers of the column selecting mechanism. Figs. 4 to 12 inclusive are all on an enlarged scale.

My invention is applicable or adaptable to typewriting machines generally but it is here shown applied to a Monarch typewriter to which the tabulating devices may be readily applied without modifying the structural features of the typewriting machine proper. The main frame of this machine comprises a base 1 from which rise posts 2 which support a top plate 3. Standards 4, mounted on said top plate, support carriage rails 5 which, through ball or roller bearings 6, support the carriage 7 in which the platen 8 is mounted. Said carriage is propelled by a spring drum 10 acting through a strap 11 and its motion is controlled by a feed mechanism comprising a feed rack 12 mounted on the rear ends of arms 13 which are pivoted at 14 to the carriage 7. Said feed rack meshes with a pinion 15, the shaft 16 of which is journaled in a bracket 17 and has mounted on its rear end an escapement wheel 18 operatively connected to the shaft in the usual manner and controlled by feed dogs 20 mounted on a dog rocker 21 which is connected by a link 22 with an arm 23 of the frame of a universal bar 24 mounted in the base of the machine. Type bars 25 are mounted on a type bar segment 26 so as to strike against the front face of the platen 8, said type bars being operated by character keys 27, the key levers of which operate sub-levers 28 connected with the type bars in the usual and well-known manner.

The parts thus far described are or may be of the usual Monarch No. 3 construction.

The Monarch No. 3 machine also comprises a column stop bar 30 mounted at the rear of the carriage on brackets 31 which project toward the rear from the main longitudinal bar of the carriage and this column stop bar is formed on two of its opposite faces with the usual slots spaced a letter space distance apart for the insertion of the column stop devices 32 which are made in the usual inverted U-shape to straddle the bar 30 and each having a rearwardly projecting part 33 for coöperation with any one of a series of denomination stops 34, each consisting of the forwardly projecting upper end of one of a series of upright levers 35.

The tabulator mechanism is operated by a series of keys 36 arranged across the back of the keyboard of the machine and each mounted on the forward end of a substantially horizontal lever arm 37 that lies above the character key levers and beneath the type bars. A system of transverse horizontal rock shafts 38 is mounted above the character key levers and beneath the type bars in a frame 40. Said frame has at its forward part brackets 41 that overlie the cross bar 42 of the base 1 to which said brackets are secured by screws 43; and said frame 40 at its rear part is secured to a second cross bar 44 of the base 1 of the main frame. The rock shafts 38 are in a left-hand set and a right-hand set, as shown in Fig. 2, and each of said rock shafts is journaled at its inner end in a bracket 45 rising from the plate or frame 40 near the middle of the machine. The shafts are arranged one in front of another and are of graduated lengths, the longest shaft in each set being at the back and each of said shafts being journaled at its outer end in one of a series of brackets 46 rising from the frame plate 40. Each of the shafts has one of the levers 37 rigidly mounted thereon near the outer end of the shaft and each of said shafts has a downwardly extending arm 47 (Fig. 1) rigidly mounted thereon near the middle of the machine, said arms 47 having their lower ends in slots 48 (Fig. 2) in a thickened part of the frame plate 40. In the present instance I have shown fourteen rock shafts 38 and fourteen keys 36. The left-hand ten of these keys are denominational keys and the right-hand four keys are column keys, said denominational keys being connected with the denominational stops 34 and the four column keys being connected with column selecting mechanism which will be described hereinafter. Each of the denominational keys operates a horizontally disposed push bar 50, each of said push bars lying in one of the left-hand ten slots 48 just behind one of the arms 47 so that when any one of the denominational keys is depressed the corresponding one of these push bars will be moved longitudinally toward the rear of the machine. These push bars extend toward the back of the machine between the upright sub-levers 28 and each of them at its rear end is received in a slot 51 (Fig. 3) in a cross bar 52 forming part of a tabulator stop frame 53 secured to the main frame of the machine at the rear of the machine. The frame 53 is here shown as consisting of a single casting comprising two uprights 54 and 55 (Fig. 3), each having a foot 56 that rests on the back shelf 57 of the base 1 to which it is secured by a screw 58. The uprights 54 and 55 support a cross bar 60. The bar 52 is secured to the front faces of the uprights 54 and 55 in any suitable manner as by screws. Said uprights carry the cross bar 60 from which rise uprights 61 and 62 which are spaced wide enough apart to inclose both the denominational stop levers and also certain upright levers of the column selecting mechanism. At its upper part the upright 62 extends horizontally toward the uprights 61 and thence upward as shown in Fig. 3 at 63, the upper part of this vertical portion 63 and of the uprights 61 being joined by a horizontal part 64 (Fig. 7) which, as here shown, is formed into a sort of hood or cover for the upper ends of the levers 35. Both the parts 63 and 61 at their upper ends extend forward as shown in Fig. 7 to conform to the shape of the upper ends of said levers 35. Just above the top plate 3 the uprights 61 and 62 are joined by a cross bar 65 which lies on top of the top plate and which is secured to said top plate in any suitable manner as by screws. The levers 35 are pivoted on a pivot rod 66 mounted at its ends in the uprights 61 and 62.

A series of levers 67 are each pivoted on the rod 66 by the side of one of the levers 35, the levers 35 and 67 alternating on the pivot rod. Each of the levers 67 has its extreme lower end in one of the slots 51 of the bar 52, and each of said levers is formed at its lower end with a notch 68 (Fig. 11) which receives the rear end of one of the push bars 50 so that when any of said bars is moved toward the rear of the machine the corresponding lever 67 has its lower end also moved toward the rear. A leaf spring 69 is mounted on each lever 67 by means of rivets 70 and each spring extends at one side beyond a side of the lever 67 to which it is secured so that the upper end of each of said leaf springs bears against a depending arm 71 of the adjacent lever 35. Each of the levers 67 also has an arm or portion 72 from which a pin 73 projects into a hole 74 in the associated lever 35, said hole being larger in diameter than the pin, and the hole and pin constituting an operating connection between the two levers but giving said levers a certain amount of motion, one independently of the other. The tension of each spring 69 normally holds the two associated levers 35 and 67 in the relative positions shown in Fig. 11 with the pin 73 resting against the lower wall of the hole 74. The construction is such that when any lever 67 is operated in the manner hereinbefore described the associated lever 35 will also be operated if it is free to move; but if said lever 35 is held against movement toward the front of the machine the lever 67 can move toward the rear of the machine, leaving the lever 35 standing still, the associated spring 69 being flexed at this time. Eeach lever 35 and the corresponding lever 67 together constitute in effect a two-part lever with a capability of limited relative motion between the two parts under certain conditions and the two parts being pivoted to turn on the same axis and operatively connected by the pin 73 and the spring 69. The column selecting mechanism is provided with means for holding the lever 35 against operation as will be hereinafter described; but if said column selecting device is not operated then when a denomination key is depressed, each companion pair of levers 67 and 35 operate as a single lever in substantially the same manner as in the present Monarch tabulator.

Each of the levers 67 has a projection 75 from the rear edge thereof, which projection is surrounded by a coiled spring 76, the rear end of which is received in a hole in the cross bar 60 of the tabulator frame (see Fig. 1), these springs 76 being under compression and constituting the returning springs for the tabulator stops and keys. These springs are staggered and are otherwise mounted in the same manner as in the present Monarch tabulator.

The column selecting mechanism best shown in Figs. 4, 5, 6, 8, 9 and 10, comprises a series of trips or contacts 77 mounted in the tabulator frame just to the right of and a little below the denomination stops, four such trips being shown in the present case. The upright parts 62 and 63 of said frame are, as shown in Fig. 6, for example, joined by a horizontal part 78 and another horizontal part 80 projects toward the right from the part 63, thus leaving a square opening 81, the right-hand side of which is closed by a plate 82 which is secured in place by screws 83 threaded into the projection 80. The trips or contacts 77 lie in the square opening 81 and are arranged one above another so as substantially to fill the opening but with freedom of motion in a front and back direction. Each of the trips 77 has projecting from the rear end thereof a lug 84 for coöperation with the upper end of one of a series of upright levers 85 which are arranged side by side and pivoted on the rod 66. As shown for example in Figs. 5 and 9 the lugs 84 are out of alinement with one another so that each of the levers 85 operates on only one of said lugs and, therefore, on only one of the trips. Each of the levers 85 has its lower end in a slot 51ª (Fig. 3) in the cross bar 52 and said levers coöperate in the same manner as the levers 67 with a series of push bars 86, the forward ends of which rest in the four right hand slots 48 of the frame plate 40 and are arranged to be operated by the four right-hand arms 47 of the rock shaft 38 and by the right-hand four keys 30, which keys are suitably designated for the different columns to be selected. The construction is such that when any one of these four column keys is depressed the corresponding trip 77 will be projected toward the front of the machine. The uppermost of these trips is arranged to be operated by the left-hand one of the four column keys and the other trips by the other keys in regular order. I have shown the levers 85 made of graduated lengths each one being long enough to reach up to the corresponding lug 84; but this graduation is not essential.

Each of the trips 77 is associated with a detent 87 consisting, in the present instance, of the pointed end of a pin which normally projects into a depression 88 formed in the left-hand wall of the opening 81. Each of these pins in the present instance, is seated in a transverse hole bored edgewise into the corresponding trip and said pins are each pressed outward by a spring 90 compressed between the bottom of the hole and a shoulder on the pin formed by reducing a portion of the pin as indicated in Fig. 5. The taper on the point of each pin 87 is such as to retain the trip against accidental displacement but to permit the said trip being moved toward the front of the machine when the key is depressed. Each of the trips 77 has a notch 91 cut out of its right-hand edge and extending from the rear of said trip forward at an inclination and terminating in a shoulder 92 as shown in Fig. 5. When the trip has been projected toward the front of the machine as shown in Fig. 9 until the shoulder 92 reaches the forward edge of the plate 82, the tension of the spring 90 of the associated detent presses the trip toward the right so that said plate 82 is received within the notch 91 and the shoulder 92 hooks over the forward edge of the plate 82 and holds the actuated trip in its projected position. The forward end of each of the trips is formed with a beveled face 93 which when the trip is in projected position is adapted to be struck by a depending contact part 94 (Fig. 1) of the corresponding one of the column stops 32. As indicated in Fig. 1 these contacts 94 are made of graduated lengths. The extreme right-hand one of the column stops has a contact 94 long enough to strike the lowermost trip 77. The next column stop has its contact 94 long enough to strike the second trip from the bottom but not long enough to strike the lowest one, and so on, the fourth column stop from the right having a contact 94 long enough only to reach the uppermost trip 77. There may also be at the left of this fourth column stop a fifth column stop without any contact 94 but formed with the stop projection 33 for coöperation with the denomination stops. This fifth or extreme left-hand stop can be selected by operating a denominational key without operating a column key. For this reason, the column keys are numbered from "2" to "5" inclusive. If the first column is to be selected without denominationally positioning the carriage the denominational key corresponding to the decimal position is actuated as will hereinafter more clearly appear. The machine is thus equipped for five columns, any one of which can be selected by the proper manipulation of keys.

In Fig. 9 the broken line 95 represents the path of the rear edges of the contacts 94. It will be seen that when the trips 77 are in normal position they are out of the paths of these contacts but when one of the trips is projected as shown in Fig. 9 its edge 93 will be struck by one of the contacts 94 during the travel of the carriage from right to left with the result that the trip will first be moved toward the left until the shoulder 92 is disengaged from the plate 82 and will then be cammed toward the rear of the machine to normal position when the associated detent 87 will engage in its recess or depression 88 and retain the trip against accidental displacement in the normal position. The trips 77 do not of themselves arrest the carriage but they control the operation of the denominational stops in a manner and by means which will now be described. As shown in Figs. 7 and 11, each of the denominational stops 34 has its upper forward corner formed with a notch 96. A bail 97 lies across the front of the tabulator frame, said bail also comprising arms 98 which extend toward the rear of the machine and are pivoted to the sides of the tabulator frame on pivot screws 99 so that the bail 97 can move up and down about these pivot screws as centers. This bail 97 is capable of dropping down into the position shown in Fig. 10 where it rests in the notches 96 of all of the denominational stops and acts as a detent to prevent any of said stops from being projected into the path of the column stops. The bail 97 is normally held up in the inoperative position shown in Fig. 7 by means of two cam edges 100, Fig. 4, on said bail coöperating with like cam edges 101 on a sliding plate 102 which is mounted on the forward face of the stop frame by means of headed and shouldered screws 103 which pass through horizontally elongated slots 104 in said plate 102, the construction being such that said plate 102 is capable of sliding in a right or left-hand direction and that when said plate is in its left-hand position the bail 97 is held up in inoperative position, and when the plate 102 is moved toward the right the bail 97 drops to its locking position by gravity. The plate 102 is extended toward the right and formed with a square opening which is of the same size as and normally registers with the opening 81 in the stop frame and through which square opening the trips 77 project. When one of these trips is moved toward the front of the machine by the depression of a column key it moves forward through the plate 102 until the shoulder 92 reaches the front edge of the plate 82. The trip is then forced toward the right by the spring 90 of its detent and it carries the plate 102 with it in this motion toward the right. This movement of the plate 102 brings the body of the plate just to the left of the opening therein into the path of the detent of the projected trip 77 as shown in Fig. 9, thus limiting the forward movement of the trip and preventing it from being forced out forwardly through the opening 81 and the corresponding opening in the plate 102. The result of the movement of the plate 102 just described is that the bail 97 immediately drops down to locking position so that if a denominational key is then depressed the corresponding stop cannot then be projected into the path of the column stops but will be held by the bail 97, and the depression of the key will operate only the lever 67 against the tension of the spring 69, moving the pin 73 into the upper part of the hole 74. When a denominational key is depressed the carriage is released by means which will presently be described, and it runs freely until the first column stop having the contact part 94 long enough to reach the particular trip 77 that has been projected, reaches said trip. When the contact moves the trip toward the left said trip carries the plate 102 with it and said plate in moving toward the left cams the bail 97 to its inoperative position, thus releasing the denominational stop corresponding to the denominational key which is maintained depressed and said stop is instantly projected toward the front of the machine by its spring 69 and into position to arrest the same column stop which operated the trip 77. Any other column stops that may have passed in the meanwhile will of course not be arrested because the denominational stop will not then have been projected to operative position. It will thus be seen that if a column key be first depressed and then released the corresponding trip 77 will be projected and will remain in projected position. If any denominational key be then depressed the carriage will be released and will be arrested in the appropriate denominational position in the column corresponding to the operated column key, intermediate columnar positions being skipped or passed.

Each of the trips 77 has a notch 105 in its left-hand edge. These notches, when the trips are in their normal position, are in position to be entered by the plate 102 when said plate is moved toward the right by the operation of some other one of the trips. By these means when one trip is operated the others are locked against operation until the first trip is restored to normal position.

The carriage release device is operated only by the denominational keys and not by the column keys. This device is in some respects of novel construction. As shown in Figs. 1 and 2 each of the push bars 50 of the denominational mechanism has a bracket or ear 106 projecting upward therefrom and thence toward the back of the machine, thus leaving a slot between said bracket 106 and the body of the bar. These brackets 106 are here shown as made of separate pieces of metal riveted to the sides of the push bars, but they may of course be made integral if preferred. A universal release bar 107 lies on the tops of all of the push bars 50 and within the slots above referred to in such position that when any one of said bars is moved toward the rear of the machine the universal bar 107 will also be moved toward the rear. Said universal bar is mounted on the forward ends of two arms 108 which at their rear ends are pivoted at 110 to arms 111 projecting upward from a rock shaft 112 which is journaled in brackets 113 projecting toward the front of the machine from the uprights 54 and 55 of the tabulator stop frame. One of the arms 111 is made of bell-crank form, having an arm 114 projecting therefrom toward the front of the machine. At its forward end this arm has a pin 115 that rests in an open ended slot in the lower end of an upright push link 116 which, as best shown in Fig. 3, is pivoted at its upper end to a transverse horizontal lever 117 pivoted at 118 to a bracket 120 depending from the top plate 3. The lever 117 has pivoted to its free end a lifter 121 having ears 122 that lie beneath the feed rack 12. The construction is such that when the universal release bar 117 is operated the lifter 121 raises the feed rack 12 out of engagement with the pinion 15 and thus releases the carriage from control of the escapement. The lifter 121 is forked at its upper end to straddle the bracket 17, which bracket thus serves as a guide for the upper end of the lifter. The lever 117 is extended toward the right beyond its pivot and is formed with a stop 123 adapted to engage the under side of the top plate and to limit the motion of the lever in one direction. It will be seen that the universal release bar 107 forms part of a pivoted frame that lies on top of the push bars 50. Said universal release bar is located in front of the bends 126 in said push bars. The rear ends of these push bars are spaced only a letter distance apart and the forward ends are spaced farther apart so as to allow the bars to pass between the sub-levers 28, without interfering with said sub-levers, and the off-set bends 126 compensate for this difference in the spacing of the bars. These bends or off-sets in the bars or in certain of said bars permit a certain amount of springing of the bars at the bends when the keys are operated and by mounting the universal bar in front of these off-sets I have arranged it so that this springing of the push bars does not affect the extent of motion imparted to the universal bar. Moreover these push bars have a greater extent of motion than any part of the levers 67 where it is convenient to locate the universal bar. The formation of the brackets 106, so as to make slots in which the universal bar lies, prevents said universal bar from becoming accidentally lifted off of the push bars. I have also made some other improvements in the denominational stop mechanism itself. The denominational stops project through a slot or opening 130 (Fig. 6), which opening is made by suitably forming two guide plates 131 and 132 which are secured by screws to the upper front face of the stop frame, the lower plate 131 being secured by the shouldered parts of the screws 103 and the upper plate 132 being secured by screws 133. These guide plates have heretofore been sometimes made as comb-plates so that each denominational stop was guided in a slot in these plates. I have omitted the teeth of these comb-plates and have riveted to the side of each of the levers 35, or of the denominational stops 34, a plate of metal 134, each of said plates being secured to the corresponding stop by rivets 135. These plates 134 are of such thickness as to take up all of the space between the denominational stops, that is to say, the combined thickness of each denominational stop 34 and its plate 134 is just equal to a letter space, and the width of the opening 130 is just equal to the number of letter spaces that the tabulator is designed to take care of. The denominational stops are further guided by means of adjustable abutments 136 consisting of screws threaded into the sides 61 and 63 of the stop frame. Each of these abutments can be adjusted by screwing it in or out, and one of them is in contact with the right-hand face of the right-hand one of the denominational stops and the other is in contact with the left-hand face of the left-hand denominational stop. The walls of the opening 130, together with these abutments constitute an efficient guide for the denominational stops. Each of the screws 136 is provided with a lock nut 137.

It will be perceived that the column selecting mechanism herein set forth acts on a novel principle in that said column selecting mechanism times the operation of the stop which actually coöperates with the column stops to arrest the carriage; that is to say, the stop which actually arrests the carriage has its operation delayed until the carriage reaches the predetermined or selected columnar field when said stop is released by the trip and is projected to operative position. It will also be perceived that these trips are arranged in a series transverse to the direction of movement of the column stops. In the present instance they are arranged one above the other. It will also be perceived that the plate 102 is arranged to be operated by any of the trips and that this plate thus constitutes a universal bar for said trips.

Various changes can be made in the details of construction and arrangement without departing from my invention.

What I claim as new and desire to secure by Letters Patent, is:—

1. In a typewriting machine and in tabulator mechanism, the combination of a series of column stops, a key-operated stop, and column selecting devices including means controlled by the column stop to be arrested for bringing said key-operated stop into coöperation with said column stop to be arrested.

2. In a typewriting machine and in tabulator mechanism, the combination of a series of column stops, a series of key-operated stops, and column selecting devices including means operated by a selected one of said column stops for bringing one of said key-operated stops into coöperation with said selected column stop to arrest the carriage.

3. In a typewriting machine and in tabulator mechanism, the combination of a series of column stops, a key-operated stop, and means controlled by a column stop for projecting said key-operated stop into the path of said column stop.

4. In a typewriting machine and in tabulator mechanism, the combination of a series of column stops, a series of key-operated stops, and means controlled by a column stop for projecting the operated one of said key-operated stops into the path of said column stop.

5. In a typewriting machine and in tabulator mechanism, the combination of a carriage, a tabulator key, a stop connected with said key, means for holding said stop retracted when the key is depressed, and means operated by the carriage for releasing said holding means.

6. In a typewriting machine and in tabulator mechanism, the combination of a carriage, a tabulator key, a stop, connections including a spring between said key and stop, means for holding said stop retracted when the key is depressed, and means operated by the carriage for releasing said holding means and permitting said spring to project said stop to operative position.

7. In a typewriting machine and in tabulator mechanism, the combination of a carriage, a tabulator stop, a series of column stops, and a trip and connections controlled by a selected one of said column stops for projecting said tabulator stop to operative position.

8. In a typewriting machine and in tabulator mechanism, the combination of a carriage, a series of column stops, a series of key-operated stops, a detent for holding said key-operated stops against movement to operative position, and column selecting mechanism including means controlled by a selected one of said column stops for releasing said detent.

9. In a typewriting machine and in tabulator mechanism, the combination of a tabulator stop, a key for said stop, operating connections between said key and stop including a spring, means for preventing operation of said stop when the key is depressed, and means for releasing said preventing means to permit said spring to operate said stop.

10. In a typewriting machine and in tabulator mechanism, the combination of a carriage, a tabulator stop, a spring for operating said stop, a key for flexing said spring, means for holding said stop against operation by said spring, a carriage release device operated by said key, and means controlled by the carriage for releasing said holding means.

11. In a typewriting machine and in tabulator mechanism, the combination of a carriage, a series of column stops, a series of separately operable stops, a latch or detent, common to said separately operable stops, column selecting mechanism including means for moving said latch to latching position, and the combination including means controlled by the carriage for releasing said latch through part of said column selecting mechanism.

12. In a typewriting machine and in tabulator mechanism, the combination of a series of denomination stops, and a bar movable to position to lock all of said stops.

13. In a typewriting machine and in tabulator mechanism, the combination of a carriage, a series of denominational stops, and column selecting mechanism including means for timing the motion of said denominational stops to operative position.

14. In a typewriting machine and in tabulator mechanism, the combination of a carriage, a series of column stops, a series of key-controlled trips arranged for operation by said column stops, and denominational stops for coöperation with said column stops and controlled by said trips.

15. In a typewriting machine and in tabulator mechanism, the combination of a carriage, a series of column selecting trips, a series of column stops, one for each of said trips, a coöperating stop, and means controlled by any one of said trips for projecting said coöperating stop.

16. In a typewriting machine and in tabulator mechanism, the combination of a carriage, a series of column selecting trips, a series of column stops, one for each trip, a series of denominational stops, and means controlled by said trips for projecting any one of said denominational stops.

17. In a typewriting machine and in tabulator mechanism, the combination of a carriage, a series of column selecting trips, a series of column stops, one for each trip, a series of denominational stops, means for operating any one of said denominational stops, and a detent for said denominational stops controlled by said trips.

18. In a typewriting machine and in tabulator mechanism, the combination of a carriage, a series of column selecting trips arranged in a series transverse to the direction of travel of the carriage, a series of column stops having graduated parts for coöperation with the respective trips, keys for operating said trips, and a coöperating stop controlled by any of said trips.

19. In a typewriting machine and in tabulator mechanism, the combination of a carriage, a series of column selecting trips, a series of column stops one for each trip, a universal bar for said trips, a coöperating stop, and a detent for said coöperating stop controlled by said universal bar.

20. In a typewriting machine and in tabulator mechanism, the combination of a carriage, a column stop, a key operated stop, a series of column selecting trips, keys for controlling said trips, a universal bar for said trips consisting of a plate adapted to be moved back and forth by any one of said trips, and means controlled by said universal bar for controlling the operation of said key-operated stop.

21. In a typewriting machine and in tabulator mechanism, the combination of a carriage, a column stop, a coöperating device adapted to be moved into position for coöperation with said column stop, a key for operating said coöperating device, and a detent for said coöperating device consisting of a spring-pressed plunger.

22. In a typewriting machine and in tabulator mechanism, the combination of a carriage, a plurality of column stops, and column selecting mechanism comprising a series of key controlled trips, keys for projecting said trips to operative position, means for retaining a projected trip in operative position, means on the column stops for releasing said trip and restoring it to normal position, and a coöperating stop controlled by said trip.

23. In a typewriting machine and in tabulator mechanism, the combination of a series of tabulator stop bars each having a part thereof constituting a tabulator stop, and each having a thickening plate secured thereto, and a guide for said stops having a space therein equal in width to the combined thicknesses of all of said stops and plates.

24. In a typewriting machine and in tabulator mechanism, the combination of a series of tabulator stops, a frame in which said stops are movably mounted and said frame having an opening of a width equal to the combined thicknesses of said stops, and an adjustable guide or abutment in said frame and contacting with the outer surface of one of the end stops of the series.

25. In a typewriting machine and in tabulator mechanism, the combination of a series of tabulator stops, a frame in which said stops are movably mounted, said frame having an opening of a width equal to the combined thicknesses of said stops, and a pair of adjustable guides or abutments in said frame and contacting with the outer surfaces respectively of the two outside stops.

26. In a typewriting machine and in tabulator mechanism, the combination of a carriage, a carriage escapement, a series of upstanding denominational stop levers, a series of longitudinally movable bars for operating said levers, a pivoted frame, arms pivoted to said frame, a universal release bar carried by said arms and coöperating with said longitudinally movable bars, and a carriage release device operated by said universal bar.

27. In a typewriting machine and in tabulator mechanism, the combination of a carriage, a carriage escapement, a series of upstanding denominational stop levers, a series of longitudinally movable bars for operating said levers and each having a lug, a pivoted frame, arms pivoted to said frame and carrying a universal release bar lying in position to be operated by any of said lugs, and a carriage release device operated by said pivoted frame.

28. In a typewriting machine and in tabulator mechanism, the combination of a carriage, a carriage escapement, a series of upstanding denominational stop levers, a series of longitudinally movable bars for operating said levers and each having a slot, a pivoted universal release bar frame having a universal release bar lying in said slots, and a carriage release device operated by said frame.

29. In a typewriting machine, the combination of a tabulator stop lever comprising two independently pivoted parts, and a spring for normally causing said two parts to move together.

30. In a typewriting machine, the combination of a tabulator stop lever comprising two independently pivoted parts, means for limiting the relative movement of said parts, and a spring for normally causing said two parts to move together.

31. In a typewriting machine, the combination of a carriage, column selecting means, denominational tabulating means, means whereby the denominational tabulating means are rendered temporarily inoperative by a prior actuation of the column determining means, and means whereby the travel of the carriage is effective to render the denominational means effective.

32. In a typewriting machine, the combination of a carriage, carriage releasing means, column selecting means, denominational tabulating means, said column selecting and denominational means including stops, different keys for said column selecting and denominational means, and means which are rendered operative by successive actuations of the keys of the column selecting and denominational means and by the travel of the carriage itself for bringing one of said stops into line with another to arrest the carriage in any desired denominational position in any selected column at the end of a single run of the carriage.

33. In a typewriting machine, the combination of a carriage, releasing means therefor, and column selecting and denominational tabulating means for arresting the carriage at any desired denominational position in any selected columnar field at the end of a single run of the carriage, said column selecting and denominational tabulating means including trip mechanism for rendering the column selecting and denominational tabulating means operative at a predetermined point in the travel of the carriage.

34. In a typewriting machine, the combination of a carriage, releasing means therefor, and column selecting and denominational tabulating means for arresting the carriage at any desired denominational position in any selected columnar field at the end of a single run of the carriage, said column selecting and denominational tabulating means including stops and trip mechanism operated by the travel of the carriage for determining at what point in the travel of the carriage said stops shall be projected one into the path of another.

35. In a typewriting machine and in tabulator mechanism, the combination of a series of column stops, a key-operated stop, and column selecting devices including means controlled by a predetermined one of said column stops for bringing about the coöperation between said key operated stop and said predetermined column stop to arrest the carriage, the predetermination of the column stops being effected by the column selecting devices.

36. In a typewriting machine and tabulating mechanism, the combination of a carriage, a stop, a tabulator key operatively connected with said stop to effect a movement of the stop, means which prevent a movement of said stop to operative position when said key is actuated, and means operated at a predetermined point in the run of the carriage for bringing about a movement of said stop to operative position.

37. In a typewriting machine, the combination of a carriage; carriage releasing means; and denominational and column selecting tabulating means for arresting the carriage at any desired position in any selected columnar position at the end of a single run of the carriage, said tabulating means comprising independently operable stops, means for locking said stops against actuation, and automatically actuated means for releasing said stops to enable them to be projected to the operative position at a predetermined point in the travel of the carriage.

38. In a typewriting machine, the combination of a carriage; carriage releasing means; and denominational and column selecting tabulating means for arresting the carriage at any desired position in any selected columnar position at the end of a single run of the carriage, said tabulating means comprising stops, and means for maintaining the stops against relative movement and out of coöperative relation during the movement of the carriage past preceding columnar fields and for automatically bringing about a relative movement of said stops into coöperative relation when the selected columnar field is reached.

39. In a typewriting machine, the combination of a carriage; carriage releasing means; and denominational and column selecting tabulating means for arresting the carriage at any desired position in any selected columnar position at the end of a single run of the carriage, said tabulating means comprising stops, and means for maintaining the stops against relative movement and out of coöperative relation during the movement of the carriage past preceding columnar fields and for automatically bringing about a relative movement of said stops into coöperative relation when the selected columnar field is reached, said last mentioned means including tripping means actuated by the travel of the carriage.

40. In a typewriting machine, the combination of a carriage; carriage releasing means; and denominational and column selecting tabulating means for arresting the carriage at any desired position in any selected columnar position at the end of a single run of the carriage, said tabulating means comprising coöperative stops, and a set of trips one for each column, said trips determining the time when the stops may be rendered coöperative.

41. In a typewriting machine, the combination of a carriage; carriage releasing means; and denominational and column selecting tabulating means for arresting the carriage at any desired denominational position in any selected columnar field at the end of a single run of the carriage, said tabulating means comprising coöperative stops including a set of denominational stops, a set of trips one for each column, and means whereby each trip is operative to render any denominational stop effective when the field corresponding to the trip actuated is reached.

42. In a typewriting machine, the combination of a carriage; carriage releasing means; and denominational and column selecting tabulating means for arresting the carriage at any desired position in any selected columnar field at the end of a single run of the carriage, said tabulating means comprising a series of denominational stops, trip mechanism, and means whereby the trip mechanism renders any denominational stop effective to arrest the carriage at any selected columnar field.

43. In a typewriting machine, the combination of a carriage, a trip, a key for setting said trip, a tabulator stop under control of said trip, and means under control of the carriage for actuating said trip.

44. In a typewriting machine, the combination of a carriage, tabulator stop mechanism for arresting the carriage, and trip mechanism operated by the carriage for controlling said stop mechanism to determine the columnar position of arrest.

45. In a typewriting machine and in tabulator mechanism, the combination of a series of column stops, a coöperating stop, and column selecting devices including means controlled by the column stop to be arrested for bringing said coöperating stop into coöperation with said column stop to be arrested.

46. In a typewriting machine and in tabulator mechanism, the combination of a carriage, a series of column stops on the carriage, a coöperating stop, keys, and means movable by said keys and coöperating with the carriage to control the projection of said coöperating stop into the path of any selected column stop.

47. In a typewriting machine and in tabulator mechanism, the combination of a carriage, a series of column stops, a series of contacts associated with said column stops, a stop for coöperation with said column stops, and means whereby said contacts control the projection of said coöperating stop into the path of a selected one of said column stops to arrest the carriage at any desired column.

48. In a typewriting machine and in tabulator mechanism, the combination of a carriage, a series of column stops, a series of contacts associated with said column stops, the several contacts having contact faces that move in different paths, keys, and means operated by said keys and controlled by said contacts for causing the projection of said coöperating stop into the path of any selected one of said column stops.

49. In a typewriting machine, the combination with a carriage, of a series of column stops provided with a series of contact devices of different lengths, one for each column, and means controlled by said contacts and coöperating with said column stops for causing the carriage to be arrested in any selected column.

Signed at Syracuse, in the county of Onondaga, and State of New York, this 13th day of January A. D. 1909.

HERBERT H. STEELE.

Witnesses:
ANNA T. LYNCH,
MARIE K. UNDERDOWN.